United States Patent [19]

King

[11] 4,310,973

[45] Jan. 19, 1982

[54] DRYING POLYMER SOLUTIONS

[75] Inventor: William R. King, Bartlesville, Okla.

[73] Assignee: Phillips Petroleum Co., Bartlesville, Okla.

[21] Appl. No.: 32,977

[22] Filed: Apr. 24, 1979

Related U.S. Application Data

[63] Continuation of Ser. No. 856,550, Dec. 1, 1977, abandoned.

[51] Int. Cl.³ ............................. F26B 3/08; F26B 3/10
[52] U.S. Cl. ........................................... 34/10; 34/12; 34/36; 34/60; 34/61
[58] Field of Search .................... 34/10, 12, 36, 60, 61

[56]  References Cited

U.S. PATENT DOCUMENTS

| | | | |
|---|---|---|---|
| 3,119,146 | 1/1964 | Crandall et al. | 18/1 |
| 3,152,872 | 10/1964 | Scoggin et al. | 34/36 |
| 3,195,613 | 7/1965 | Hawkins | 159/47 |
| 3,251,428 | 5/1966 | Tabler | 117/100 |
| 3,279,087 | 10/1966 | Hearne et al. | 34/12 |
| 3,295,221 | 1/1967 | Joy | 34/10 |
| 3,326,781 | 6/1967 | Wilson, Jr. | 203/83 |
| 3,394,995 | 7/1968 | Kloepfer et al. | 23/302 |
| 3,450,183 | 6/1969 | Hinton | 159/2 |
| 3,457,248 | 7/1969 | Cunningham et al. | |
| 3,905,122 | 9/1975 | Ohshima et al. | 34/17 |
| 3,928,813 | 3/1960 | Bliss | 260/83.7 |

FOREIGN PATENT DOCUMENTS 596798  5/1978  U.S.S.R.

OTHER PUBLICATIONS

Lykov, Drying in Chemical Engineering, Moscow, KHIMIA 1970, pp. 301–305.
Encyclopedia of Polymer Science and Technology, vol. 5, pp. 209–213, © 1966, John Wiley & Sons, Inc.

Primary Examiner—John J. Camby

[57] ABSTRACT

The drying of a polymer solution by the removal of solvent is accomplished by flashing the polymer solution while spraying into a bed of substantially dry polymer particles. The dryer polymer particles coat the partially dried solution polymer droplets, and the remaining solvent is removed by the energy produced from the mechanical agitation of the bed and the passing of a heated inert gas through the polymer bed.

38 Claims, 3 Drawing Figures

DRYING POLYMER SOLUTIONS

This is a continuation of copending application Ser. No. 856,550, filed Dec. 1, 1977, now abandoned.

SUMMARY OF THE INVENTION

This invention relates to the recovery of a polymer from a solution. In one aspect, it relates to the recovery of a polymer from a solution by a novel spray drying method. In another aspect, it relates to a method of drying a polymer which cannot be conventionally spray dried by using an agitated bed of relatively dry polymer particles which serves as a heat transfer medium in the process and which offers a nonfouling intangible surface for the impingement of the sprayed droplets. In another aspect, it relates to a method of drying a polymer using an agitated bed wherein the bed is violently agitated with simultaneous grinding of large agglomerates of the polymer. In yet another aspect, it relates to the passing of heated inert gas countercurrent to a bed of polymer particles into which a polymer solution is sprayed for the recovery of polymer from the solution. In a further aspect, dry polymer is recovered from a polymer solution in an evaporation method which is carried out in the absence of any substantial amount of water or steam. In yet another aspect, this invention relates to the recovery of a rubbery polymer from a solution by the removal of solvent through the use of a novel spray drying method. In still another aspect, it relates to a spray drying method in which the bed temperature is controlled by the feed rate and the discharge rate of dry particles from the bed is controlled by the agitator power input. In still another aspect, this invention relates to a method of drying a polymer by using an agitated bed of relatively dry polymer particles and adding the polymer solution below the surface of the bed.

Many prior art methods are known for the recovery of a polymer from its solution; however, there are many disadvantages to these methods such as water contamination, inefficient use of energy and safety, and health hazards.

A typical method for recovering a polymer from its solution is illustrated in U.S. Pat. No. 3,326,781. The method employed is that of steam stripping.

As disclosed in U.S. Pat. No. 3,326,781, reactor effluent is flash concentrated; the concentrated solution then passed to a two-stage steam stripper to remove nearly all the remaining solvent. The product from this operation is a crumb in water slurry which must then be dewatered before passing to the final drying step which is generally carried out in a mechanical device such as a devolatilizing extruder. Such extruders require additional large expenditures of energy to remove the water picked up in stripping the solvent. Typically, only 25 percent of the energy is usefully employed in this combination process. The amount of steam consumed in the stripping process is enormous. Since much of the steam leaves the stripper in the vapor state a large part of its heat is dissipated against cooling water in the overhead condenser. The recovered water-saturated solvent must then be dried (e.g., by fractionation) before it can be recycled to the process. Further, excess process water discarded from the system must be treated before it can be reused or wasted to some surface water system. Additional problems of a water system include: (1) chemicals used in the strippers are a serious source of mineral contamination to the product; (2) the water interface in the water-solvent separator is a source of color bodies which degrade the product; (3) all equipment following addition of water must be stainless steel; (4) chloride ion stress corrosion of the stainless steel extrusion dryer is a major maintenance factor in this massive equipment; (5) the problem of removing the water from the polymer requires additional energy comparable to that needed to remove the solvent; (6) traces of solvent remaining in the wet rubber are lost to the atmosphere in the open water removal step; solvent losses are costly and may be a health hazard; and (7) the high temperatures required to remove the water in the extruder dryers form gels and otherwise degrade the rubber.

Another method used in the drying of a polymer is disclosed in U.S. Pat. No. 3,450,183 where polymer solution is flashed below the melting point of the polymer to obtain an essentially dry or solid flash residue. The residue is chopped and then dried further by contacting with hot purge gas in a mechanically agitated zone. The polymer is then passed to a vacuum-extruder for final drying of the polymer. The problem is that the method is only operable with those polymers that will flash to form an essentially dry solid, whereas if the polymer solution upon flashing retains enough solvent to be a sticky mass, the equipment will become all fouled up. A rubbery polymer solution is one example wherein after several stages of flash the rubber solution reaches a viscous stage which still is not dry, yet it cannot be pumped or handled otherwise either.

Another method is disclosed in U.S. Pat. No. 3,251,428 where a slurry of polyolefin is sprayed into a fluidized bed of polyolefin particles. The slurry coats the particles, then the hot vaporous solvent used to fluidize the bed vaporizes any solvent remaining in the coating. Problems arise, however, when the polymer bed becomes too sticky to fluidize. Safety hazards are increased due to the use of the hydrocarbon as a fluidizing medium. The system, as well, is generally inefficient energy-wise.

The present invention overcomes the problems involved in the prior methods of recovering a polymer from its solution as it removes the possibility of water contamination in the product, fouling of the equipment, is much more efficient in use of energy, and decreases the risk of many safety and health hazards present in the prior art methods. The present invention heats the polymer solution to a temperature sufficient that upon spraying a major part of the solvent is vaporized. The spray is directed into a bed of dryer polymer particles so that the droplets, which would normally coalesce into a viscous mass, are enveloped by a dense cloud of hot dry polymer particles, thereby avoiding a viscous sticky mass that fouls up the equipment. The remainder of the solvent is removed due to the energy supplied by the heated inert gas passed through the bed of polymer particles and the mechanical energy from the mechanical agitator. The circulation of drying gas, and thereby the size of the drying vessel and associated equipment, is greatly reduced due to the heat input that is mechanically transmitted by the frictional contacting of the particles with each other and with the agitator paddles. The intense shear forces generated by the agitator can also, for some polymers, act to reduce any agglomerates to a powder thus maintaining the large surface area needed for the process without grinding and recirculating the fines. As well, the use of an inert gas, for example, $N_2$, decreases the risk of safety hazards as to fire and health hazards with respect to breathing hydrocarbon gases. The problems arising through the use of water in a solvent stripping process is also eliminated due to eliminating the direct use of water or steam.

The present invention also contemplates the use of a grinder, if necessary, to grind the larger agglomerates of polymer in the bed with recycling of the fines. The mechanical agitation can be such that a vortex is formed at the top of the bed, tending to thereby fling the larger agglomerates of polymer particles to the sides of the vessel. A grinder can then scoop up the large agglomerates and grind them to fines, with the fines being recycled. The use of the grinder will facilitate the expediency of the process and keep the larger particles from consuming the entire bed as the lumps will be ground before growing large enough to disturb the operation. The grinder, therefore, makes continuous operation possible. The intense shear forces developed in the bed by the mechanical agitator tend to break down agglomerates as they form, however. In some situations this can be sufficient to make a separate grinder unnecessary.

The present invention is most readily applicable to any polymer solution which can yield a flowable crumb at a temperature of about 20°–50° F. (11°–28° C.) above the normal boiling point of the solvent in the environment of intense mechanical agitation found in the evaporator tank. Most rubbery polymer solutions, particularly butadiene-styrene rubber solutions, meet this requirement. The process is also applicable to polymers which remain semi-fluid even when dry and cold, e.g., high cis-polybutadiene polymer solutions, as the tendency for the soft particles to agglomerate is partially overcome by the mechanical agitator ripping the bed apart and maintaining a major part of the bed in particulate form.

Operation of the invention is usually at a temperature between the boiling point of the solvent and the softening point of the polymer. For example, in the drying of a butadiene-styrene rubber copolymer in a solution of cyclohexane, the preferred operation temperature is 190°–195° F. (88°–91° C.). Higher temperatures, however, can be used in conjunction with higher agitator speeds as the higher agitator speeds largely overcome the problem of stickiness. Operation at a temperature below the boiling point of the solvent is possible but at the expense of a longer residence time. Operation below atmospheric pressure, however, is effective in reducing the temperature of the solvent's boiling point, yet maintaining a nonsticky crumb without the penalty of a long residence time.

An object of this invention is to provide a method of recovering a polymer from solution.

Another object is to provide a method of recovering a polymer from solution without the use of steam or water due to the problems that arise therefrom, yet be an efficient and economical method.

Another object is to provide such a method that requires less circulation of stripping gas than previously taught in the art.

Another object is to provide a method of recovering polymer from solution in which the equipment stays relatively clean and dry and is not gummed up with sticky polymer.

Another object is to provide such a method for recovering rubbery polymers from solution.

Another object is to provide such a method for recovering a butadiene-styrene copolymer from cyclohexane.

Other objects and advantages of this invention will be readily apparent to those skilled in the art from the accompanying disclosure, drawings, and appended claims.

DETAILED DESCRIPTION OF THE INVENTION

In the process of drying a polymer in solution or recovering the polymer from solution, the solution of polymer is first heated to a temperature sufficient to vaporize a substantial portion of the solvent upon flashing. The preheating temperature must not be such as to cause thermal degradation of the polymer, but a maximum temperature without thermal degradation can be used. In the case of a rubbery polymer solution such as butadiene-styrene copolymer in cyclohexane, the temperature for preheating can reach 400° F. (204° C.) without adverse effects of thermal degradation being encountered. The preferred temperature range for preheating the rubbery polymer is about 300°–400° F. (149°–205° C.).

Once the polymer solution has been sufficiently heated, the solution is flashed by spraying into a mechanically agitated bed of dry polymer particles. The flashing of the solvent yields droplets of higher solids content. Generally, 25–70 percent of the solvent is removed in the spray flash depending on the characteristics of the polymer, the viscosity of the solution, and its concentration. In regard to the concentration of the polymer solution, the polymer solution can be concentrated by flashing in one or more stages before it is heated and sprayed into the mechanically agitated bed of polymer particles of the present invention. The droplets formed, which would normally coalesce into a viscous mass, are then enveloped by a dense cloud of hot, dry polymer particles. The dry polymer weight of the cloud exceeds the dissolved polymer weight by 10 to 1. The resulting form is agglomerates having a sticky droplet as a core and a coating of dry polymer on the surface. The average solids is 78 percent with it ranging from 25 percent at the center to 100 percent (dry) solids at the surface of the agglomerate.

The bed of polymer particles is mechanically agitated in such a manner that a significant amount of energy is put into the system by mechanical agitation. Typically, the mechanical energy input supplies 30–65 percent of the total energy requirement for the drying process.

The remainder of the energy required for the drying process is supplied by passing a hot inert gas countercurrent to the polymer particles. The gas is passed under such conditions that its energy, along with that being put into the system by mechanical agitation, removes substantially all the remaining solvent from the polymer. Besides carrying heat into the system, the hot inert gas acts as a stripping agent to aid in the removal of the solvent from the polymer. The inert gas can also be recovered and recycled.

The gas is inert, preferably $N_2$, in order to reduce the safety and health hazards of using a hydrocarbon gas such as cyclohexane and to minimize oxidation of the hot polymer. Besides $N_2$, examples of other inert gases which can be used are $CO_2$ and fuel gas. The temperature of the inert gas is usually fixed at some temperature above the normal boiling point of the solvent, but below the softening point of the polymer. In the case of drying a butadiene-styrene rubbery copolymer in solution in cyclohexane, an operating temperature of 190°-225° F. (88°-107° C.) is preferred. Since this temperature is above the boiling point of the solvent cyclohexane, the solvent will be vaporized and carried off, yet the polymer will not stick to the equipment since the temperature is either below the softening point of the polymer or the temperature exceeds the softening point only to the extent that the shear forces generated by the agitator are greater than the forces of the polymer causing it to stick. A polymer crumb that is sticky and forms a lump when at rest is entirely different when shear forces are applied thereto. Forces rendering the polymer sticky are small compared to the internal shear forces generated by the agitator. Normally "sticky" material remains free flowing in a highly agitated bed, but will block into a lump after it is removed and is in a static state. At extreme conditions, e.g., operating temperatures that greatly exceed 225° F. (107° C.) in the case of drying a butadiene-styrene copolymer, "stickiness" can become a problem despite the input of mechanical agitation.

The temperature of the bed can be kept controlled either by the constant countercurrent circulation of the inert gas through the bed of polymer particles or by controlling the rate at which the polymer solution is added to the bed as the more polymer solution added the lower the temperature of the bed whereas the temperature of the bed will tend to increase as less polymer solution is added. The temperature at which the bed is kept is a temperature at which the polymer particles would not tend to be sticky in the highly agitated bed. The temperature of the bed would depend upon the polymer and the solvent. The temperature at which the bed is kept can be substantially the same as the temperature of the inert gas circulating therethrough. For a butadiene-styrene copolymer bed and $N_2$ as the inert gas, the bed is kept at about 190°-225° F. (88°-107° C.). The amount of circulation of the inert gas is greatly reduced in the present invention due to the input of energy by the mechanical agitation.

The agitation of the bed of dry polymer particles can be so violent as to create a vortex of particles, thus throwing the oversize agglomerates toward the vessel wall. The agglomerates can then be scooped into a grinder and ground into fine polymer particles which are returned to the bed. The recycling of the fines can occur immediately, at the top of the bed; or the fines can be reintroduced at the bottom of the bed along with the inert gas stream; or anywhere along the bed of polymer particles.

For some polymers, however, a vortex is not essential as it is possible to lower the nozzle into the heart of the agitated bed rather than just spraying onto the surface of a vortex. The polymer solution is, therefore, added below the surface of the bed with flashing still occurring simultaneously and the polymer being dried by mechanical agitation and inert gas stripping. The invention contemplates, therefore, the addition of the polymer solution below the surface of the bed.

Due to the intense shear forces developed in the bed by the agitator, some polymers do not tend to form any agglomerates as the shear forces tend to break down agglomerates as they form. The grinder, therefore, is optional and is generally unnecessary when violent agitation (e.g., 0.5-2 horsepower per pound of polymer in the bed) is used.

Polymer particles of the bed can be removed from the bottom of the bed, however, and passed to a blower-grinder. The particles are then ground and recycled to the top of the bed or at some intermediate point. In this manner a fresh supply of fine, dry polymer particles is always available for the bed. The rate of discharge of polymer from the vessel may also be controlled by a slide valve which is automatically controlled by the motor load of the mechanical agitator. The greater the load on the motor, the more the gate is opened, the smaller the load on the motor, the more the gate closes. Since the motor load depends on the weight of the bed, this is an acceptable control means of automatically controlling the depth of the bed.

The invention is most readily applicable to any polymer solution which can yield a flowable crumb at a temperature of about 20°-50° F. (11°-28° C.) above the normal boiling point of the solvent. That is, the invention can be used on any solution of a normally solid polymer which can be particulated in a spraying device and is not unduly sticky at the temperatures necessary to evaporate the solvent. Suitable polymers include polymers and copolymers of butadiene, styrene, isoprene, polyolefins, and the like. The solvents used will, of course, depend on the polymer to be processed.

Most rubber solutions meet the requirements, therefore, the invention is especially applicable to solutions of rubbery polymers. One specific rubber solution is that of a rubbery copolymer of 75 weight percent butadiene and 25 weight percent styrene in a solvent of cyclohexane.

As to the equipment used in the present invention, all equipment is conventional with the exception of the agitated bed. This unit can be somewhat similar to densifiers or polishers which are commercially available from equipment manufacturers such as Wedco, Inc., West Memphis, Arkansas. The essential features of the agitated bed are: (1) it presents a violently agitated surface of particles as to the spray of polymer solution in such a manner that there is little, if any, opportunity for the spray to impact equipment surfaces; (2) the surface and design of agitator paddles are such that at an agitator speed of several hundred RPM the bed is completely mixed (this also serves to carry heat generated below the surface of the bed up to the surface where the heat demand exists) and efficiently contacted with the purge gas while providing sufficient frictional resistance to permit high power input to the agitator; and (3) the vessel should have sufficient volume to provide adequate holdup of the polymer particles. It has been found that an agitator speed in the range of 300 to 2,000 RPM is desirable, depending on the diameter of the vessel, with about 600 to 1800 RPM preferred, the speed tending to be lower for larger size equipment. A holdup time of 5-30 minutes is generally adequate, with a time of 10-20 minutes preferred. The vessel can be vertically or horizontally disposed, but the vertical position is generally preferred since it provides a somewhat uniform bed, permits a vapor disengaging zone in the top of the vessel, and serves to seal off the discharge opening from the vapor space. A length/diameter ratio of about 2½ or more is preferred to provide good countercurrent contacting of the polymer particles with the purge gas. Work input to the agitator is generally sufficient to evaporate 5 to 50 percent of the solvent in the feed with about 20 to 30 percent being typical for a 13 weight percent rubber solution.

Figure 1:
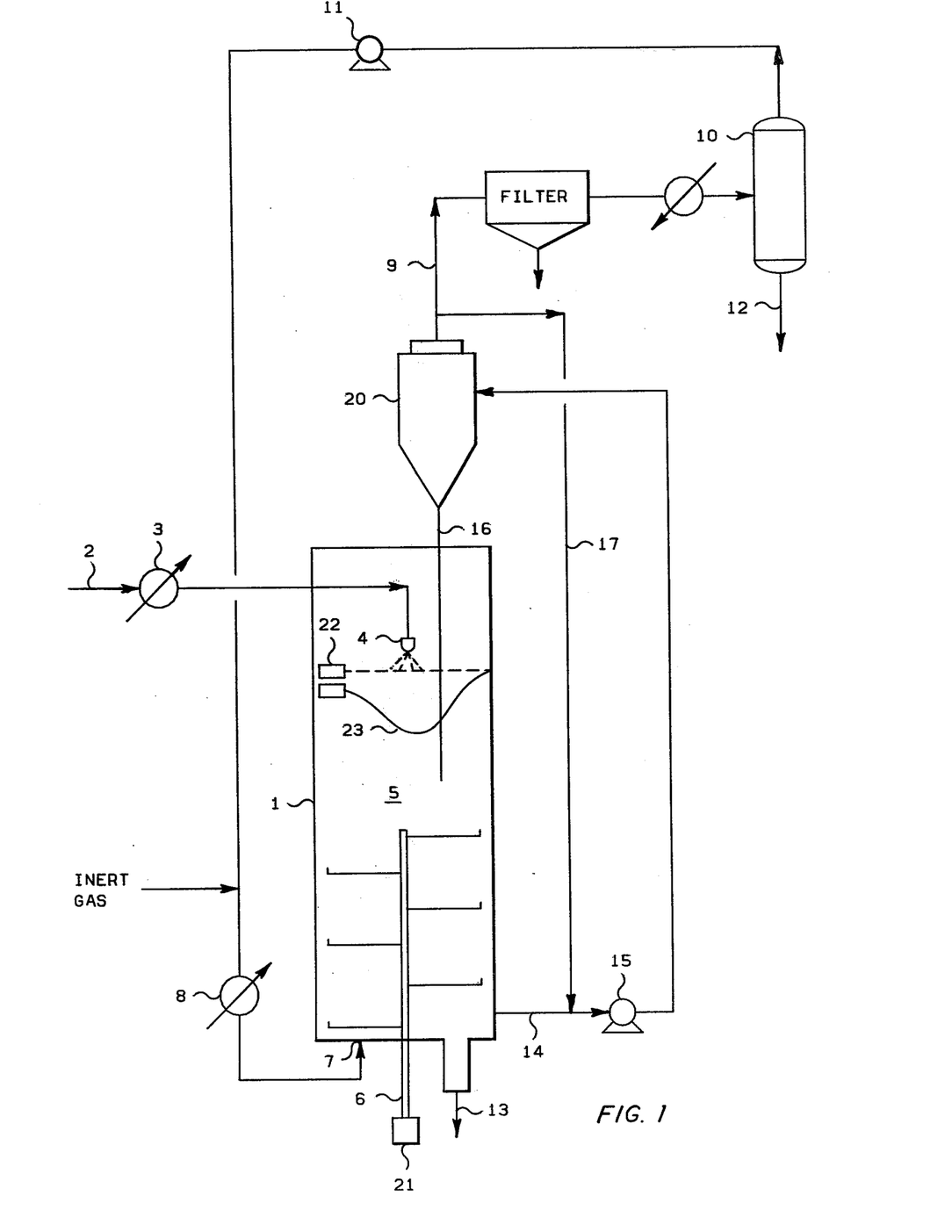
FIG. 1 shows the general scheme of a vertical bed continuous process.

In the drawings, FIG. 1 shows the present invention using a vertical bed 1 of dry polymer particles. The feed 2 comprises a polymer solution with the polymer being rubbery polymer such as a butadiene-styrene copolymer and the solvent being a typical solvent used in conjunction with the polymer, e.g., cyclohexane. The feed first passes through a preheater 3, which heats the feed to a temperature sufficient to vaporize a substantial portion of the solvent upon flashing. In the case of a butadiene-styrene rubber copolymer in cyclohexane solvent, the feed is heated to about 350° F. (177° C.). The heated polymer solution is then flashed while sprayed, 4, into a bed of substantially dry polymer particles 5. The bed of polymer particles consists of the same polymer as in the polymer solution, i.e., butadiene-styrene copolymer. In the case of a non-grindable polymer such as high cis-polybutadiene (cis-4), the bed can initially be made up of any convenient polymer powder and gradually displaced by the polymer from the polymer solution. The bed of dry particles is kept at a constant temperature through the input of energy by the mechanical agitator 6, a countercurrent flow of inert gas entering at the bottom of the bed 7, and the rate of addition of polymer solution feed. For the butadienestyrene rubber copolymer, the bed is kept at a constant temperature of 225° F. (107° C.). The inert gas, preferably $N_2$, is heated at the inert gas heater 8 to 225° F. (107° C.) and circulated through the bed so that the energy from the gas and the mechanical stirrer is sufficient to keep the bed at the constant temperature of 225° F. (107° C.). The volume of $N_2$ can be as high as ten times the volume of solvent vapor, and, because it is in countercurrent flow, the discharge rubber is in contact with the hottest and dryest $N_2$.

The inert gas flow also strips solvent from the surface and interstices of the agglomerate to keep it dry and nonsticky on the outside. The temperature does not need to be as high as the boiling point of the solvent—it could even be room temperature, but the residence time would be much longer. Solvent vapor from the flash or from the stripping action of the inert gas is removed via cyclone 20 through conduit 9 which carries the solvent vapor and inert gas to condenser-inert gas separator 10. Liquid solvent is then transported by conduit 12 to further use or storage, and the inert gas passes through compressor 11, heater 8, and enters the bed of dry particles at 7.

Dry polymer is removed from the bed through conduit 13 at the rate that polymer is fed into the bed through the feed and recycle 16. Conventional valve apparatus for removing polymer from a stripping zone can be used, such as a screw discharge and rotary valves. The discharge can also be controlled by a slide valve which is automatically controlled by the load on the motor 21. Part of the dry polymer can be recycled by passing through conduit 14 to blower-grinder 15, which grinds the agglomerated particles into a fine dust, and reenters the bed at 16. Inert gas via conduit 17 helps carry the particles through conduit 14. Thereby, the process is continuous, and it is assured that fine, dry polymer will be available at the top of the bed to coat the partially dried polymer sprayed into the bed.

FIG. 1 also shows a grinder 22 at the surface of the polymer bed 5. A vortex 23 is formed due to the violent agitation of mechanical agitator 6. The formation of the vortex due to the violent agitation also causes the larger agglomerates to polymer to be flung to the sides of the bed where they are scooped into the grinder 22 and ground into fines. The fines can be recycled immediately onto the top of the bed or recycled at the bottom of the bed or at some intermediate point.

The grinder is optional as considerable grinding of the polymer particles can occur in the blower-grinder 15. The grinder may also be unnecessary as the shear forces developed in the bed by the agitator will at times, depending on the polymer and degree of mechanical agitation, be sufficient to break down the agglomerates as they form.

The creation of a vortex surface 23 is also not always necessary as the nozzle 4 can be located below the surface of the bed.

Figure 2:
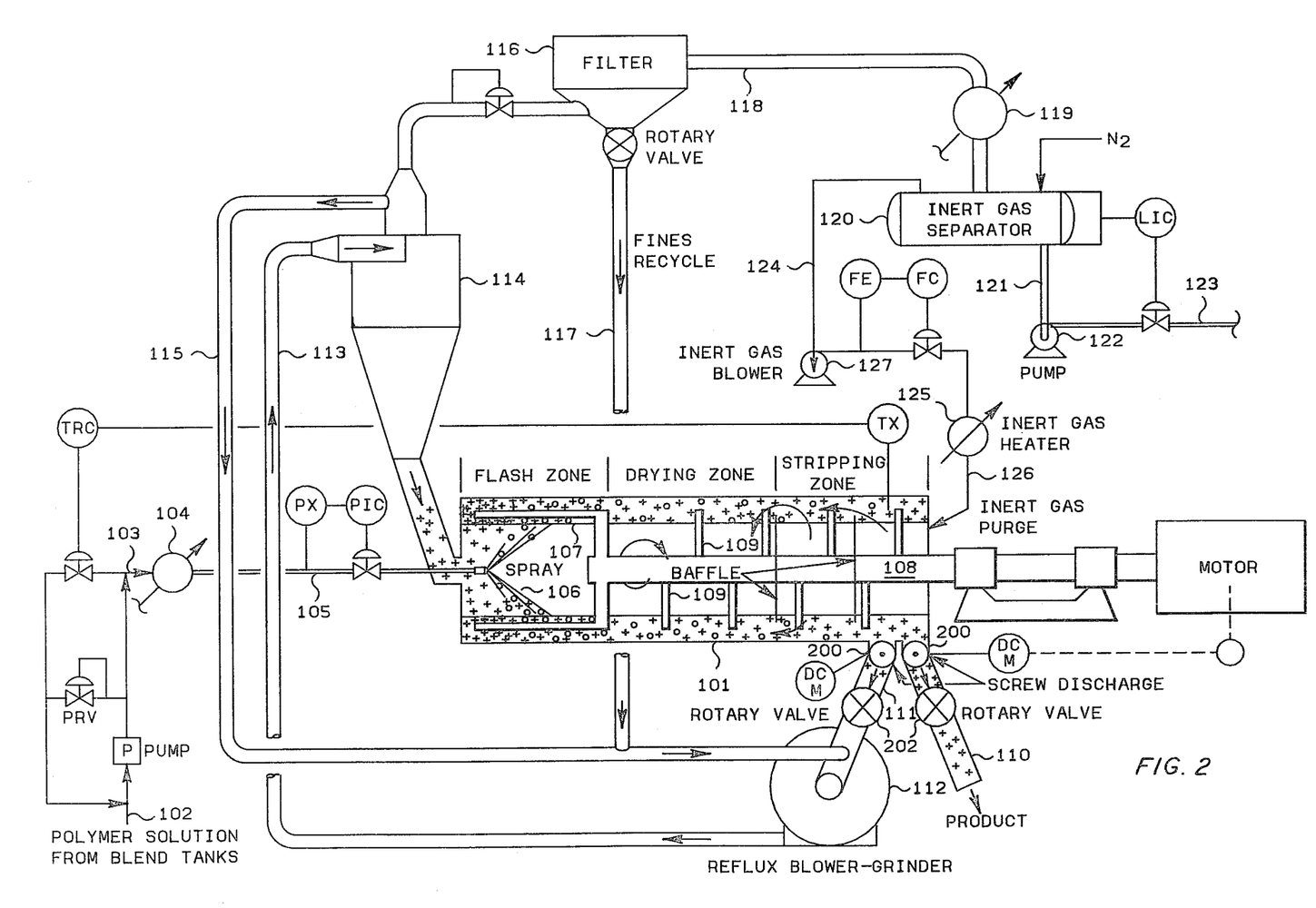
FIG. 2 shows the general scheme of a horizontal bed continuous process.

FIG. 2 shows the present invention in conjunction with a horizontal bed 101. The polymer solution is passed via conduits 102 and 103 to heater 104 where it is preheated to the appropriate temperature. The heated polymer solution is then passed by way of 105 into bed 101 where it is flashed and sprayed into the bed of dry polymer particles 107.

The bed is stirred by mechanical agitator 108 and inert gas 109 is passed countercurrent to the polymer particles. Dry product is taken from the bed for further use by conduit 110 while other dry polymer product is removed by way of conduit 111 and passed to blower-grinder 112. The polymer is removed through conventional apparatus such as screw discharge means 200 and rotary valves 202. Once at the blower-grinder, the polymer particles are then ground to fines and recycled to the feed end of the bed by way of 113 and cyclone 114.

Gases containing fines from the top of the cyclone are passed through conduit 115 back to blower-grinder 112.

Inert purge gas and stripped or flashed solvent passes up through the cyclone and to filter 116 to remove any fines carried with the gases. The fines filtered from the gases are then returned to the bed by way of conduit 117, blower-grinder 112, conduit 113, and cyclone 114. The filtered gases and vapors are then passed through conduit 118 through condenser 119 and inert gas separator 120. The liquid solvent is then removed by conduit 121 and pumped by pump 122 through conduit 123 to storage or further use. The inert gas is passed through conduit 124 via blower 127 to heater 125 and then introduced into the product end of the bed of dry polymer particles at 126.

Figure 3:
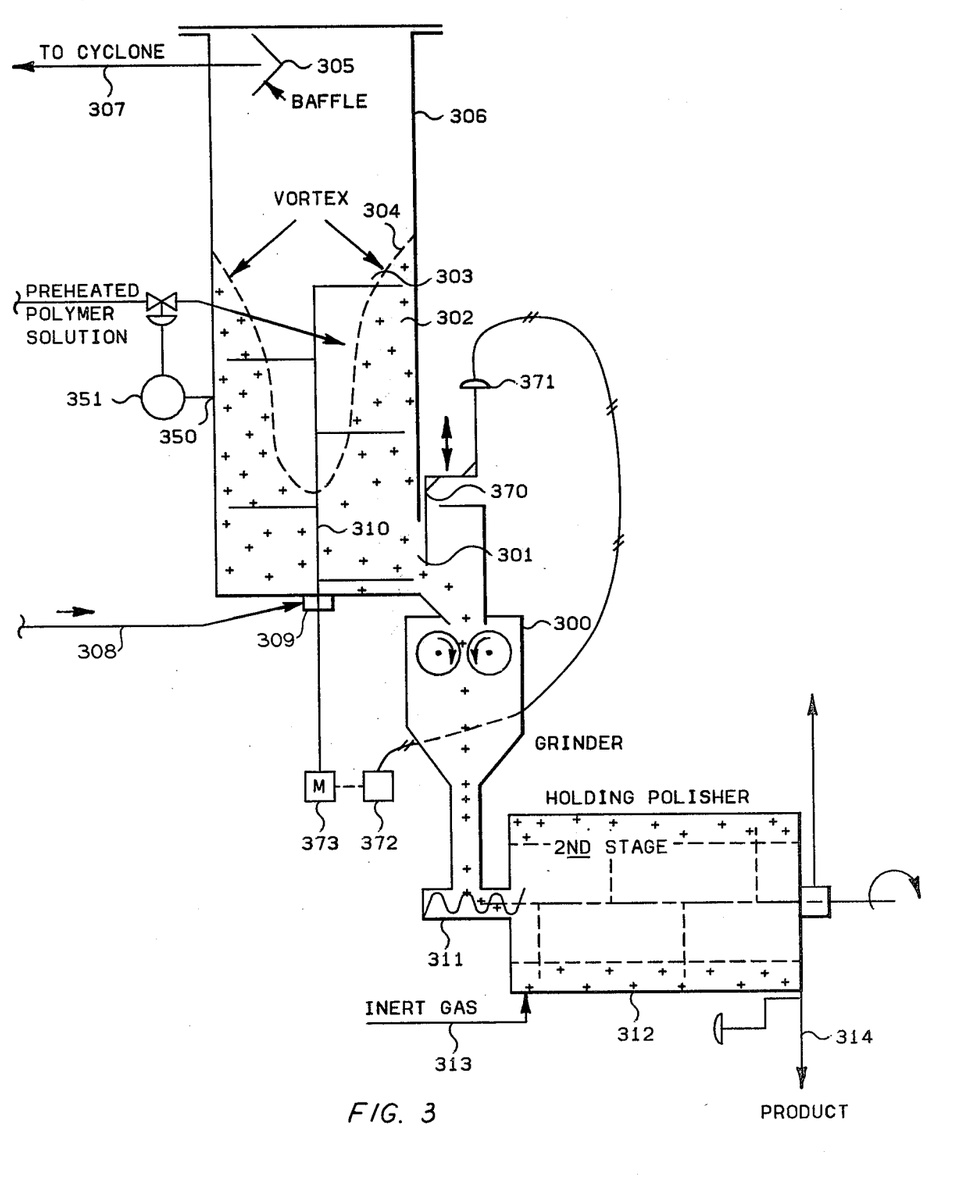
FIG. 3 shows a method for control of the process, as well as an optional grinder at the discharge of the bed with the polymer passing to a holding polisher for final drying.

FIG. 3 shows a vertical bed that differs from that shown in FIG. 1 in that an optional grinder 300 is located at the discharge 301 of the bed 302.

In the Figure, preheated polymer solution is added 303 onto the surface of the vortex 304. Baffle 305 is used to help separate dust from the vapor that passes out the top of vessel 306 and via conduit 307 to cyclone separator (not shown), a condenser, a heater, and recycled via 308 as the countercurrent inert gas purge. The gas purge may enter the vessel through the shaft seal 309 of mechanical agitator 310 in order to help cool the seal and exclude air.

As mentioned above, polymer is discharged through 301 to grinder 300, the polymer then passing via a screw conveyor 311, or some other suitable means, to a holding polisher 312. The holding polisher also receives a gas purge for final drying. The polisher is conventional equipment, e.g., such as the holding polisher manufactured by Wedco, Inc., and rotates at low speed, e.g., 60–100 RPM. Vapor recirculation is not shown, but obviously may be used. The product is removed from the polisher at 314.

When a two-stage drying system is used as shown in FIG. 3, an inert gas purge in vessel 306 and in polisher 312, the volume of the inert gas purge in vessel 306 will be very nominal, sometimes as small as less than one volume per volume of solvent vapor. A more substantial purge rate is used in the second stage polisher, e.g., equal to about 10 volumes per volume of solvent. Since the volume of solvent removed in the polisher, or second stage is very small, e.g., less than one percent of the total solvent removed, a high purge rate of inert gas (up to 10 times the solvent volume) can be easily tolerated in the polisher since the actual volume of inert gas used would still be quite small.

Also shown in FIG. 3 is one possible method of controlling the process. Thermocouple 350 measures the temperature of bed 302. The information is received by the control means 351 which thereby automatically adjusts the rate of polymer solution flow into the bed. The control means can be any suitable control means known in the art. The temperature of the bed is thereby automatically controlled as control means 351 adjusts the feed rate to allow more solution to be added if the temperature of the bed is too high in order to lower the temperature of the bed, and to decrease the rate of solution flow when the temperature of the bed is too low in order to allow the temperature of the bed to rise to the predetermined temperature.

A control means for the discharge of polymer particles from vessel 306 is also shown. Slide valve 370 regulates the discharge rate of the polymer particles, and the slide valve is controlled by control means 371. The control means can be a pneumatic-type operation or any suitable control means known in the art. The control means 371 controls the slide valve 370 upon receiving a signal from motor load measuring device 372. The motor load measuring device measures the load on motor 373, control means receives the data signal and accordingly adjusts the slide valve. The depth of the bed is thereby automatically controlled as the motor load is dependent upon the weight of the bed. Therefore, when the motor load is great, meaning great depth of the bed, the motor load measuring means senses the load and feeds the information to the control means 371 which will then open the slide valve in order to increase the polymer discharge rate. This will continue until the predetermined depth is reached, thereby the predetermined load on the motor is obtained. When the load on the motor is small, however, the control means automatically lowers the slide valve in order to decrease the discharge rate until the predetermined level is reached.

Reasonable variations and modifications of this invention can be made, or followed in view of the foregoing, without departing from the spirit or scope thereof.

I claim:

1. A process for removing a solvent from a solution containing polymer and solvent characterized by:
   mechanically agitating a bed of polymer particles; and
   spraying the solution into the thus agitated bed at a solution temperature sufficient to vaporize a major portion but substantially less than all of the solvent upon spraying, the solution temperature being below the thermal degradation point of the polymer, thereby vaporizing a major portion of the solvent, and wherein
   mechanically agitating the bed of polymer particles removes at least a substantial portion of the remaining solvent.

2. A process as defined in claim 1 characterized by preheating the solution to the solution temperature.

3. A process as in claim 2 further comprising:
   circulating a drying gas through the thus mechanically agitated bed.

4. A process as in claim 3 wherein:
   the drying gas is an inert gas.

5. A process as in claim 4 further comprising:
   heating the inert gas to a gas temperature in a temperature range above boiling point of the solvent but below the thermal degradation point of the polymer to form a heated gas stream.

6. A process as in claim 5 wherein:
   the heated gas stream is passed countercurrently to the polymer particles under conditions of temperature and pressure sufficient to remove substantially all remaining solvent.

7. A process as in claim 2 wherein:
   a significant part of energy required for removing solvent is introduced by mechanically agitating the bed of polymer particles.

8. A process as in claim 7 wherein:
   preheating the solution to a solution temperature introduces in the range of 25 to 70 percent of the energy required for removing solvent;
   mechanically agitating the bed introduces in the range of 30 to 65 percent of the energy required for removing solvent; and
   passing the heated gas stream countercurrently to the flow of particles in the particle bed introduces in the range of 0 to 10 percent of the energy required for removing solvent.

9. A process as in claim 2 further comprising:
   mechanically agitating the bed of polymer particles to form a vortex therein;
   spraying the polymer solution onto the surface of the thus formed vortex, the vortex throwing oversize agglomerates of polymer to a position at which the oversize agglomerates can be scooped into a grinder;
   grinding the oversize agglomerates into fine polymer particles; and
   returning the thus-ground fine polymer particles to the bed of polymer particles.

10. A process as in claim 2 wherein:
    the polymer solution is sprayed into the bed of polymer below the surface of the bed.

11. A process as in claim 2 wherein:
    the bed is mechanically agitated by violent agitation in the range of about 0.5 to about 2 horsepower per pound of polymer in the bed.

12. A process as in claim 2 further comprising:
    removing polymer particles from the bottom of the bed of polymer particles;
    grinding the thus removed particles; and
    recycling the thus ground particles to the bed.

13. A process as in claim 2 wherein:
    the polymer solution can yield a flowable crumb at a temperature of about 20° to about 50° F. above the normal boiling point of the solvent in the thus mechanically agitated bed of polymer particles.

14. A process as in claim 13 wherein:
    the polymer solution is a solution of rubbery polymer.

15. A process as in claim 14 wherein:
the polymer solution is a solution of butadiene-styrene rubbery copolymer;
the solvent is cyclohexane; and
the polymer solution is preheated to a temperature in the range of about 300° to about 400° F.

16. A process as in claim 15 wherein:
the inert gas is heated to a temperature of about 190° to 225° F. (88° to 107° C.) before passing said inert gas through to the bed of dry polymer particles, the inert gas is $N_2$, and the butadienestyrene rubbery copolymer is a 75 weight percent butadiene-25 weight percent styrene copolymer.

17. A process as in claim 16 wherein:
the bed of dry polymer particles is kept at a temperature of about 190° to 225° F. (88° to 107° C.) by maintaining the passage of inert gas and the mechanical agitation sufficient to produce such a result.

18. A process as in claim 2 wherein:
the rate of adding the preheated polymer solution into the mechanically agitated bed of substantially dry polymer particles is automatically controlled by control means which senses the temperature of the bed and thereby controls the rate of feed of polymer solution proportional to the temperature of the bed in order to maintain the temperature of the bed constant.

19. A process as in claim 2 wherein:
substantially dry polymer particles are removed from the bottom of the bed and the rate of discharge of said particles is automatically controlled by a control means which senses the load on the motor of the mechanical agitator and proportionally adjusts a control valve for the discharge of the particles from the bed depending upon the motor load in order to maintain the depth of the bed at a desired level.

20. A process as in claim 19 wherein:
the control valve for the discharge of the particles from the bed is a slide valve near the bottom of the bed.

21. Apparatus comprising:
a vessel for containing a bed of polymer particles, said vessel having a polymer inlet, a polymer outlet for removing dry polymer from the bed, a gas inlet, and a gas outlet;
inert gas means in flow communication with the gas inlet for passing inert gas countercurrent to the bed of polymer particles;
agitator means operably associated with the interior of the vessel for agitating the bed of polymer particles to produce an agitated bed of polymer particles, said agitator means including agitator paddles for mixing the bed of polymer particles and a motor means for driving the agitator paddles;
a spray means for spraying a polymer solution into the agitated bed of polymer particles;
preheater means connected in flow communication with the spray means for preheating a polymer solution to a temperature sufficient to vaporize a substantial portion of the solvent of the polymer solution upon flashing;
a blower grinder;
conduit means for conveying dry polymer from the vessel to the blower grinder;
a cyclone filter having an inlet, an overhead outlet, and a fines outlet;
conduit means for conveying fines from the blower grinder to the inlet of the cyclone filter; and
means for conveying fines from the fines outlet of the cyclone filter to the polymer inlet of the vessel.

22. Apparatus as in claim 21 further comprising:
filter means for filtering polymer fines from gases having an inlet and an outlet;
conduit means for conveying gases containing fines from the overhead outlet of the cyclone filter to the inlet of the filter means; and
conduit means for conveying polymer fines from the filter means to the polymer inlet of the vessel.

23. Apparatus as in claim 22 further comprising:
conduit means for conveying polymer fines and gases from the overhead outlet of the cyclone filter to the blower grinder.

24. Apparatus as in claim 22 further comprising:
grinder means at the surface of the polymer bed for removing agglomerates of polymer and grinding the removed agglomerates into fines.

25. Apparatus as in claim 22 further comprising:
a grinder attached in flow communication to the polymer outlet of the vessel for receiving polymer therefrom and having a grinder outlet;
a holding polisher having an inlet and an outlet; and
a screw extruder for conveying polymer particles from the grinder outlet to the inlet of the holding polisher.

26. Apparatus as in claim 25 wherein:
the holding polisher rotates at a speed in the range of 60 to 100 RPM.

27. A method as in claim 1 wherein:
the bed of polymer particles is contained in a vessel having agitator paddles operably associated therewith for agitating the bed of polymer particles and further having motor means for driving the agitator paddles, the vessel further having spray inlet means for spraying the polymer solution into the agitated bed of polymer particles, and further having a polymer outlet for removing dry polymer from the bed.

28. A method as in claim 27 wherein:
the motor means is effective to drive the agitator paddles at a speed in the range of 300 to 2000 rpm.

29. A method as in claim 27 wherein:
the motor means is effective to drive the agitator paddles at a speed in the range of 600 to 1800 rpm.

30. A method as in claim 27 wherein:
the motor means is effective to introduce mechanical energy into the bed in the range of 0.5 to 2 horsepower per pound of polymer in the bed.

31. Process comprising:
(a) providing a mechanically agitated bed of particles; and
(b) introducing a polymer solution in solvent onto the particles of the mechanically agitated bed; wherein the bed is mechanically agitated in an amount sufficient to maintain a constant temperature above the boiling point of the solvent by input of mechanical energy and evaporate a substantial portion of the solvent.

32. A process as in claim 31 wherein the particles of the bed comprise polymer particles.

33. A process as in claim 32 wherein the polymer of the particles is different from the polymer of the solution.

34. A process as in claim 32 wherein the polymer of the particles is the same as the polymer of the solution.

35. A process as in claim 34 wherein the polymer comprises a rubbery polymer.

36. A process as in claim 35 wherein the rubbery polymer solution in solvent is sprayed onto the rubbery particles of the mechanically agitated bed of rubbery particles.

37. A process as in claim 36 wherein the bed of rubbery particles having rubbery polymer solution in solvent sprayed thereon is agitated by stirring.

38. A process for forming rubbery polymer particles from a solution of rubbery polymer comprising:

(a) mechanically stirring a bed of rubbery polymer particles;

(b) spraying a solution of the rubbery polymer in solvent onto the particles of the mechanically stirred bed to evaporate a substantial portion of the solvent from the solution; wherein the bed is mechanically stirred in an amount sufficient to
  (i) maintain the bed at a constant temperature above the boiling point of the solvent; and
  (ii) maintain a major part of the bed in particulate form.

* * * * *